US008676026B2

(12) United States Patent
Fujimoto et al.

(10) Patent No.: US 8,676,026 B2
(45) Date of Patent: Mar. 18, 2014

(54) DATA RECORDING APPARATUS

(75) Inventors: Naoki Fujimoto, Osaka (JP); Hiroyuki Awano, Osaka (JP); Kengo Yasumura, Osaka (JP); Keigo Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 13/338,614

(22) Filed: Dec. 28, 2011

(65) Prior Publication Data

US 2012/0163763 A1 Jun. 28, 2012

(30) Foreign Application Priority Data

Dec. 28, 2010 (JP) ................................. 2010-291942

(51) Int. Cl.
*H04N 5/77* (2006.01)
*H04N 5/917* (2006.01)
(52) U.S. Cl.
USPC .......................................... 386/225; 386/333
(58) Field of Classification Search
USPC .......... 386/225, 224, 248, 326, 333, 337, 341
See application file for complete search history.

(56) References Cited

U.S. PATENT DOCUMENTS

2005/0031297 A1 2/2005 Kaise et al.
2011/0055297 A1 3/2011 Maeda et al.

FOREIGN PATENT DOCUMENTS

| EP | 0795863 A2 * | 9/1997 |
| EP | 1 492 014 | 12/2004 |
| JP | 6-161676 | 6/1994 |
| JP | 2003-296177 | 10/2003 |
| JP | 2006-120200 | 5/2006 |
| WO | 2010/103760 | 9/2010 |

* cited by examiner

*Primary Examiner* — Robert Chevalier
(74) *Attorney, Agent, or Firm* — Wenderoth, Lind and Ponack, L.L.P.

(57) ABSTRACT

A data recording apparatus includes an acquisition unit configured to acquire a first type data and a second type data, and a recording unit configured to record the first type data or the second type data acquired by the acquisition unit in a recording medium. The recording unit refers to a first pointer which indicates a logical position regarding the first type data in the recording medium to determine a position to start recording the first type data based on the logical position indicated by the first pointer. The recording unit refers to a second pointer which indicates a logical position regarding the second type data in the recording medium to determine a position to start recording the second type data based on the logical position indicated by the second pointer.

9 Claims, 7 Drawing Sheets

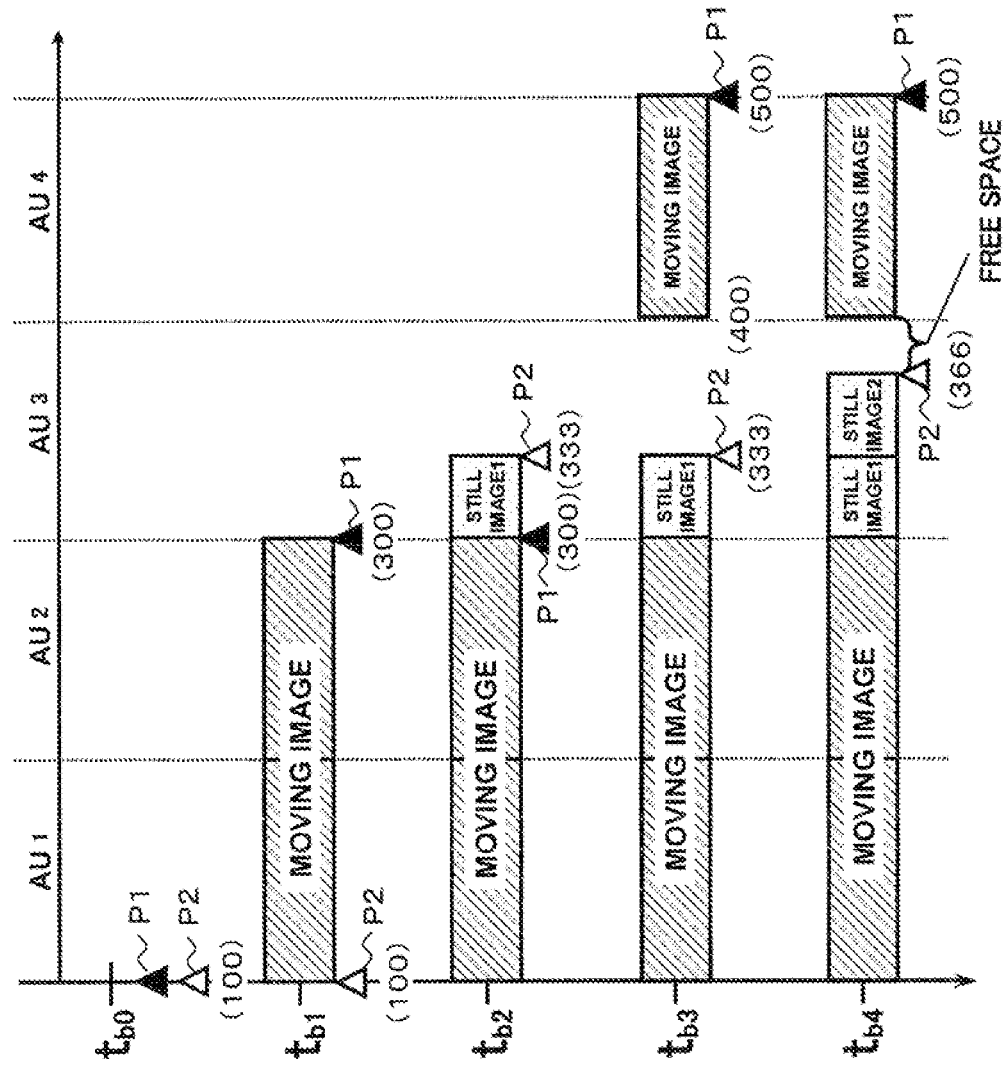

DATA RECORDING APPARATUS

BACKGROUND

1. Technical Field

Technical field relates to a data recording apparatus and, more specifically to, a data recording apparatus for recording two or more types of data in a recording medium.

2. Related Art

JP2006-120200A discloses a recording/reproducing device. The recording/reproducing device includes a recorder for recording real-time data and non-real-time data to be reproduced simultaneously with the real-time data in a disk and a controller for controlling the recorder so that a region to record the non-real-time data may be dispersed in a middle area of a region to record the real-time data.

This configuration realizes effective data allocation on the disk which is suitable for recording of the real-time data and the non-real-time data to be reproduced simultaneously with the real-time data.

In recording data in a recording medium, if management as to which storage region records which type of data is made properly, fragmentation would often occur. It results in remarkable waste of storage regions of the recording medium.

SUMMARY

To solve the problem, a data recording apparatus is provided that can reduce the waste of recording regions of a recording medium.

In a first aspect, a data recording apparatus is provided that includes an acquisition unit configured to acquire a first type data and a second type data, and a recording unit configured to record the first type data or the second type data acquired by the acquisition unit in a recording medium. The first type data and the second type data have different units of recording data in the recording medium. The recording unit refers to a first pointer which indicates a logical position regarding the first type data in the recording medium to determine a position to start recording the first type data based on the logical position indicated by the first pointer. The recording unit refers to a second pointer which indicates a logical position regarding the second type data in the recording medium to determine a position to start recording the second type data based on the logical position indicated by the second pointer. The recording unit starts recording the first type data or the second type data in the recording medium at the determined start position.

In a second aspect, an imaging apparatus is provided that includes an imaging unit configured to generate moving image data and still image data, and a recording unit configured to record the moving image data or the still image data generated by the imaging unit in a recording medium. The recording unit refers to a first pointer which indicates a logical position regarding the moving image data in the recording medium to determine a logical position to start recording the moving image data based on the logical position indicated by the first pointer. The recording unit refers to a second pointer which indicates a logical position regarding the still image data in the recording medium to determine a logical position to start recording the still image data based on the logical position indicated by the second pointer. The recording unit starts recording the moving image data or the still image data in the recording medium at the determined logical position.

According to the above aspect, a pointer is prepared which indicates a logical position in a recording medium for each of many types of data and a position to start recording the data may be obtained based on the pointer. By managing the pointer for each type of data, it is possible to manage the recording position in the recording medium to record the data in unit of data recording, thereby reducing waste of recording regions of the recording medium.

BRIEF DESCRIPTION OF DRAWINGS

FIG. 7 is a diagram for explaining transition of a pointer which indicates a position (logical address) to record moving image data and a pointer which indicates a position to record still image data in a case where the data is recorded in accordance with a data recording method of an embodiment.

DETAILED DESCRIPTION OF PREFERRED EMBODIMENTS

1. First Embodiment

A first embodiment in which a digital video camera is explained as one embodiment of a data recording apparatus is described with reference to the drawings.

1.1 Overview

The digital video camera of the present embodiment can capture a moving image and a still image. The digital video camera generates moving image data or still image data based on an image signal generated by a CMOS image sensor. The digital video camera records the generated moving image data or the still image data on a memory card.

When completing the recording of the moving image data, the digital video camera stores in a buffer memory a "moving image pointer" which indicates a position (logical address) in which the moving image data is recorded last on the memory card. When completing the recording of the still image data, the digital video camera stores in the buffer memory a "still image pointer" which indicates a position (logical address) where the still image data is recorded last on the memory card.

When subsequently recording new moving image data or new still image data, the digital video camera refers to the pointer stored in the buffer memory to determine a position to start the recording of the new moving image data or the new still image data based on the logical address indicated by the pointer.

In such a manner, the digital video camera of the present embodiment uses the two types of pointers, namely, a moving image pointer (first pointer) for a logical recording position of moving image data and a still image pointer (second pointer) for a logical recording position of still image data, to control recording of image data on the memory card. Using these two types of pointers allows recording positions to be managed in accordance with the kind of image data, thereby reducing waste of recording regions of the memory card.

1-2. Configuration
1-2-1. Digital Video Camera

Figure 1:
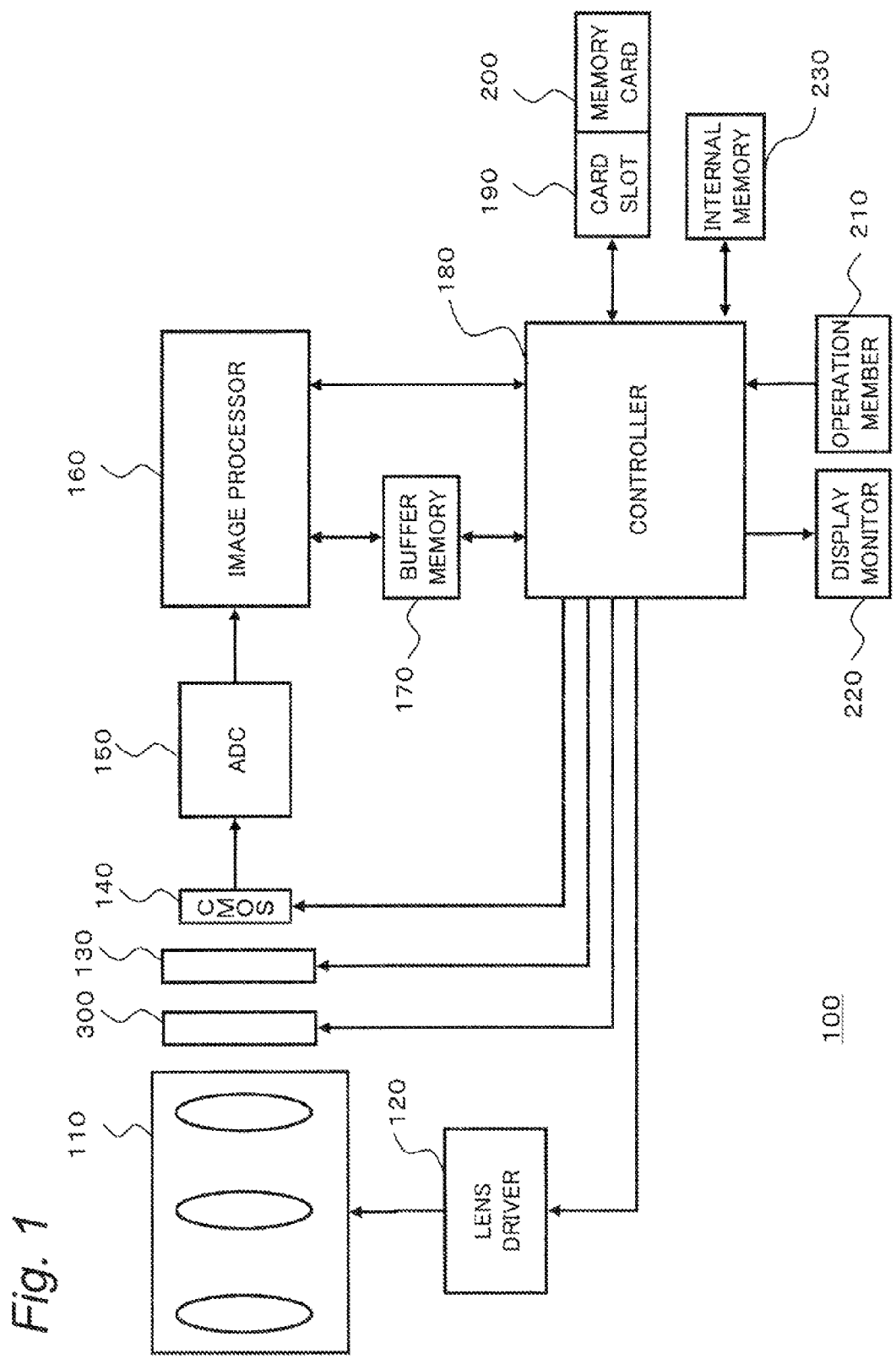
FIG. 1 is a block diagram showing a configuration of a digital video camera.

A description will be given of a configuration of the digital video camera according to the present embodiment with reference to FIG. 1. FIG. 1 is a block diagram showing the configuration of the digital video camera 100. The digital video camera 100 captures a subject image formed through an optical system 110 including one or a plurality of lenses with a CMOS image sensor 140. Image data generated by the CMOS image sensor 140 undergoes various kinds of processing through an image processor 160 and is stored on a memory card 200. The configuration of the digital video camera 100 is described in detail.

The optical system 110 includes a zoom lens and a focus lens. By moving the zoom lens along an optical axis, the subject image can be zoomed in or out. By moving the focus lens along the optical axis, the focus of the subject image can be adjusted.

A lens driver 120 drives the respective lenses included in the optical system 110. The lens driver 120 includes, for example, a zoom motor for driving the zoom lens and a focus motor for driving the focus lens.

A diaphragm 300 adjusts a size of an aperture automatically or in accordance with user's settings, thereby regulating amount of light passing therethrough.

A shutter 130 is means for shutting out light incident on the CMOS image sensor 140.

The CMOS image sensor 140 captures a subject image formed through the optical system 110 to generate image data. The CMOS image sensor 140 performs various operations such as exposure, transfer, and electronic shuttering.

An A/D converter 150 converts analog image data generated by the CMOS image sensor 14 to digital image data.

The image processor 160 performs various kinds of processing on the image data generated by the CMOS image sensor 140 to generate image data to be displayed on a display monitor 220 or generate image data to be stored on the memory card 200. For example, the image processor 160 performs various kinds of processing such as gamma correction, white balance correction, and scratch correction on the image data generated by the CMOS image sensor 140. Further, the image processor 160 compresses the image data generated by the CMOS image sensor 140 in a compression format complying with H.264, MPEG2, or other standard. The image processor 160 can be realized with a DSP or a microcomputer.

A controller 180 is a control section for controlling an entirety operation of the digital camera. The controller 180 can be realized with a semiconductor device or the like. The controller 180 may be configured with hardware alone or realized with a combination of hardware and software. The controller 180 can be realized with a microcomputer, etc.

The buffer memory 170 functions as a working memory for the image processor 160 and the controller 180. The buffer memory 170 can be realized with, for example, a DRAM or a ferroelectric memory.

A card slot 190 is capable of receiving the memory card 200 and connecting with the memory card 200 mechanically and electrically. The memory card 200 contains a flash memory and a ferroelectric memory so that data such as an image file generated by the image processor 160 can be stored therein. The memory card 200 will be described in detail later.

An internal memory 230 is configured with a flash memory or a ferroelectric memory. The internal memory 230 stores, for example, a control program for controlling the entirety of the digital video camera 100.

An operation member 210 is a generic name of a user interface for receiving user's operations. The operation member 210 may be realized by, for example, arrow keys or a determination button for receiving user's operations.

A display monitor 220 is capable of displaying an image (through image) which is illustrated by image data generated by the CMOS image sensor 140 or an image which is illustrated by image data read from the memory card 200. Further, the display monitor 220 is capable of displaying various kinds of menu screens which are used to make various kinds of settings of the digital video camera 100.

1-2-2. Memory Card

Figure 2:
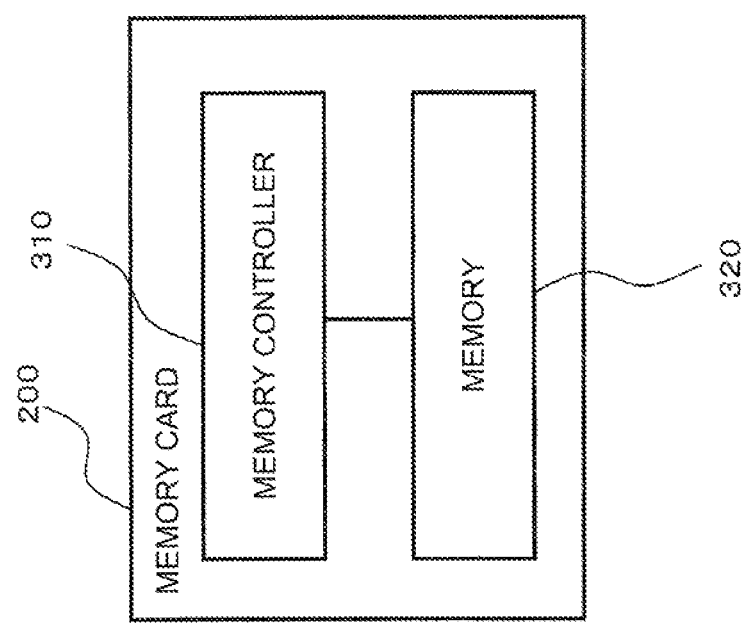
FIG. 2 is a diagram showing a configuration of a memory card.
Figure 3:
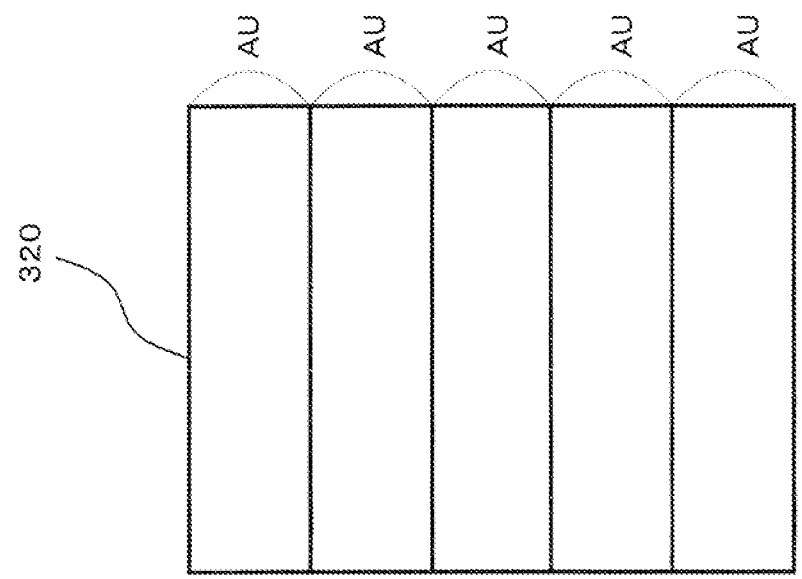
FIG. 3 is a diagram showing a logical configuration of storage regions of a memory.

Next, a description will be given of details of the memory card 200 with reference to FIGS. 2 and 3. FIG. 2 is a diagram showing a configuration of the memory card 200. FIG. 3 is an explanatory diagram showing a logical address configuration of storage regions of a memory 320 on the memory card 200.

As shown in FIG. 2, the memory card 200 includes a memory 320 for storing data and a memory controller 310 for controlling data writing to/reading from the memory 320. The memory controller 310 recognizes that a recording region of the memory 320 is composed of a plurality of logical allocation units (hereinafter abbreviated as "AU") each of which has a predetermined size as shown in FIG. 3. In a case where the memory 320 is configured with a flash memory, the AU corresponds to, for example, one or a plurality of erase blocks.

In the present embodiment, the memory controller 310 conducts write control so that when writing data in the memory 320, data in a destination AU in which new data is written is deleted once and then the new data is written in the destination AU in which data has been deleted.

In a case where a destination AU, in which data is newly written, has already been written data and the written data should not be deleted, the memory controller 310 conducts write control as follows. The memory controller 310 once saves the data already written in the destination AU into a buffer region of the memory card 200 and then deletes the data in the destination AU. Subsequently, the memory controller 310 writes the data saved in the buffer region of the memory card 200 into the destination AU and further writes data to be newly written into the destination AU successively.

In such a manner, in order to add data to an AU in which other data which should not be deleted is already stored, it is necessary to save the other data into the buffer region once and then write back the saved data again. Therefore, in order to record data into an AU including data which should not be deleted, it takes time more than a case of recording data in an AU including no data which should not be deleted.

To solve the problem, in a case of recording moving image data, which requires real-time recording, in the memory card 200, the controller 180 commands the memory controller 310 of the memory card 200 to write the image data into an AU including no data which should not be deleted. On the other hand, in a case of recording still image data, which requires less real-time recording than moving image data, in the memory card 200, the controller 180 commands the memory controller 310 to search for an address at which data can be written following the address where still image data was recorded last and write the data starting from the searched address, irrespective of whether or not the data which should not be deleted is written.

1-2-3. Correspondence of Terms

The configuration including the optical system 110, the CMOS image sensor 140, the A/D converter 150, and the image processor 160 is one example of an acquisition unit or an imaging unit. The memory card 200 is one example of a recording medium. The controller 180 is one example of a recording unit. The digital video camera 100 is one example of a data recording device or an imaging device. Moving image data and still image data are examples of a first type of data and a second type of data, respectively.

1-3. Operations

Figure 4:
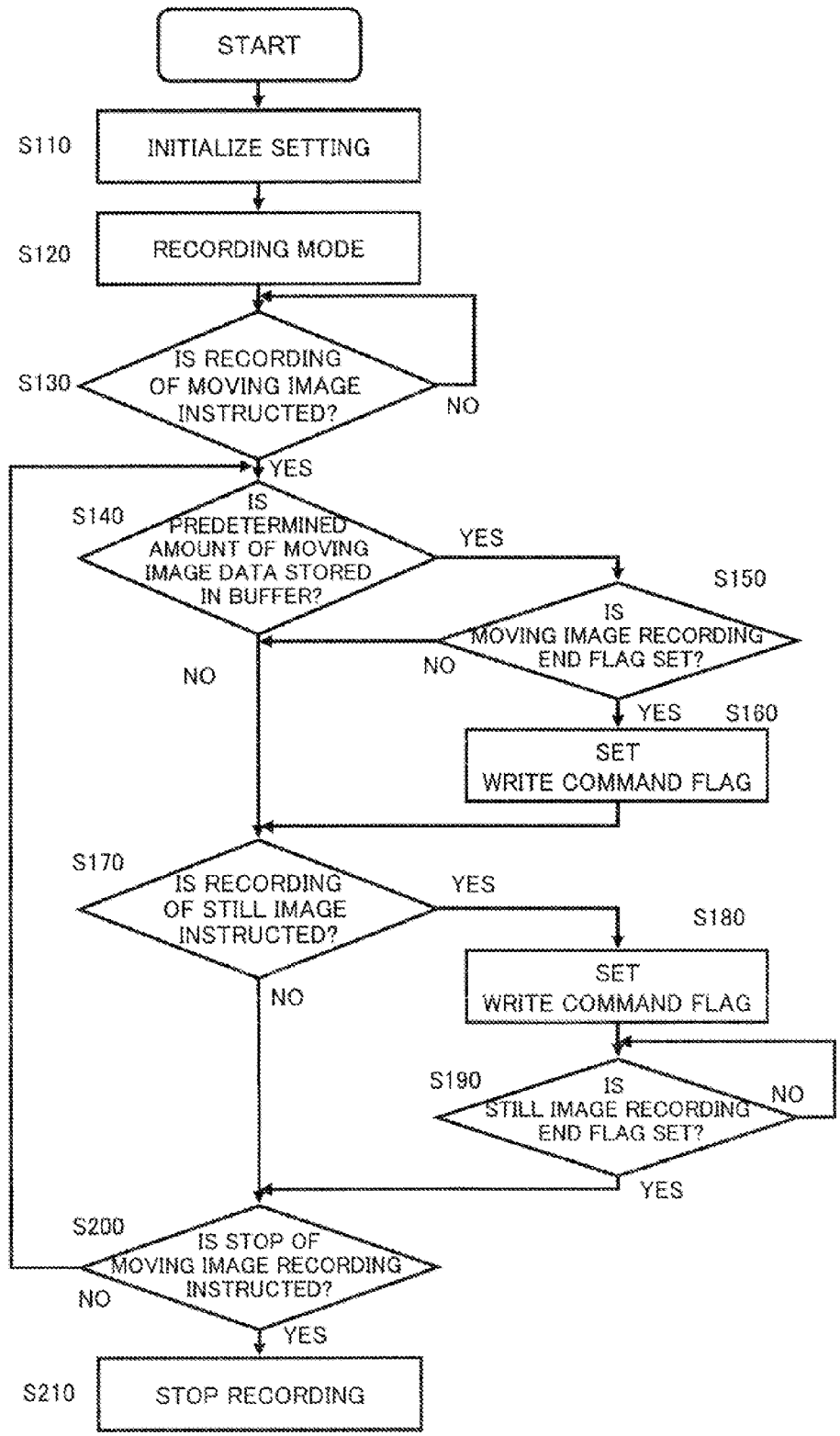
FIG. 4 is a first flowchart for data recording operations in the digital video camera.
Figure 5:
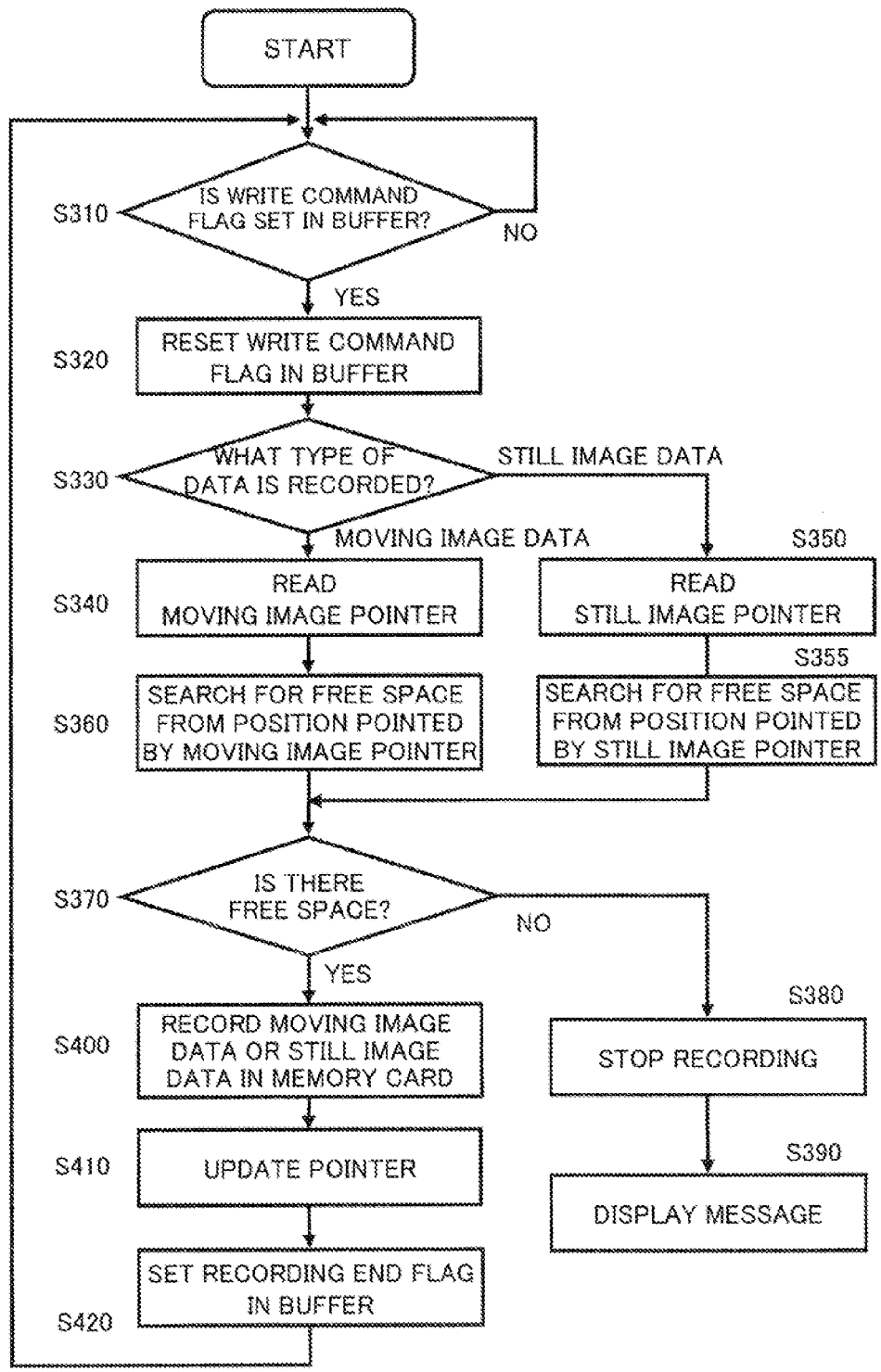
FIG. 5 is a second flowchart for data recording operations in the digital video camera.

A description will be given of operations to record moving image data or still image data (hereinafter referred to as "image data" generically) onto the memory card 200 in the digital video camera 100 with reference to FIGS. 4 and 5. The controller 180 processes, in time-division parallel processing TUMMY, two control flows indicated by the respective flowcharts in FIGS. 4 and 5, thereby recording image data onto the memory card 200. FIG. 4 is the first flowchart for the operation by the controller 180 to record image data in the memory card 200. FIG. 5 is the second flowchart for the operation by the controller 180 to record image data in the memory card 200.

First, a description will be given of processing indicated by the first flowchart shown in FIG. 4. A user turns on a power of the digital video camera 100 by operating a power button in the operation member 210. When the power is turned on, the controller 180 performs physical initial settings and logical initial settings on the memory card 200 (S110). For example, as the physical initial setting, the controller 180 acquires information on capacity of the memory card 200, information indicating whether the memory card 200 is writable or not, and the like. Then, the controller 180 records the acquired information in the buffer memory 170. As the logical initial setting, the controller 180 records in the buffer memory 170 an initial value of a position to start search for a position on the memory card 200 to start recording of moving image and an initial value of a position to start search for a position on the memory card 200 to start recording of still image data. Specifically, the controller 180 records an initial address (0) in the buffer memory 170 as the initial value of the position to start search for the position to start recording of the moving image data. Further, the controller 180 records the initial address (0) in the buffer memory 170 as the initial value of the position to start search for the position to start recording of the still image data.

When the initial settings are completed, the controller 180 sets the digital video camera 100 to a recording mode (S120). When set to the recording mode, the controller 180 stands by for a user's instruction to record a moving image (S130).

When receiving the instruction to record a moving image, the controller 180 determines whether or not a predetermined amount of moving image data is stored in the buffer memory 170 (S140). The predetermined amount refers to a data amount that corresponds to as size of one AU. When determining that the predetermined amount of moving image data is stored in the buffer memory 170, the controller 180 determines whether or not a moving image recording end flag is stored in the buffer memory 170 (that is, whether or not the moving image recording end flag is set) (S150). The moving image recording end flag refers to information indicating whether or not recording of a moving image is completed. More specifically, the moving image recording end flag is information indicating whether or not recording of moving image data stored in the buffer memory 170 onto the memory card 200 is completed. The moving image recording end flag is set by the processing in step S420 in the flowchart shown in FIG. 5 to be described later.

When determining that the moving image recording end flag is stored in the buffer memory 170 (the moving image recording end flag is set), the controller 180 records a write command flag in the buffer memory 170 (that is, sets the write command flag) (S160). The write command flag is a flag to command to write moving image data from the buffer memory 170 to the memory card 200 and is referred to in the processing in step S310 in the flowchart shown in FIG. 5 to be described later. Further, besides the write command flag, the controller 180 records information indicating that a target to be written is moving image data, in the buffer memory 170 (S160). By referring to this information, the controller 180 can determine whether or not the current target to be written is moving image data or still image data.

When determining in step S140 that the predetermined amount of moving image data is not stored or when the recording of the write command flag, or the like in the buffer memory 170 is completed in step S160, the controller 180 determines whether or not a user's command to record a still image is received (S170).

When determining that the command to record a still image is received, the controller 180 records a write command flag in the buffer memory 170 (that is, sets the write command flag) (S180). Further, along therewith, the controller 180 records information indicating that the target to be written is still image data, in the buffer memory 170 (S180). After recording the write command flag in the buffer memory 170, the controller 180 determines whether or not a still image recording end flag is stored in the buffer memory 170 (S190). The still image recording end flag refers to information indicating whether or not recording of a still image is completed. More specifically, the still image recording end flag is information indicating whether or not recording of still image data stored in the buffer memory 170 in the memory card 200 is completed.

When determining in step S170 that the command to record a still image is not yet received, or after the still image recording end flag is set in step S190, the controller 180 determines whether or not a command to stop a moving image recording is received (S200). When determining that the command to stop a moving image recording is received, the controller 180 stops recording of moving image data in the memory card 200 (S210). When the command to stop a moving image recording is not yet received, the controller 180 repeats the processing from step S140 to step S200 until receiving the command to stop a moving image recording.

Next, a description will be given of processing indicated by the flowchart shown in FIG. 5. The flowchart shown in FIG. 5 illustrates processing which is performed in particular when the write command flag is set in the buffer memory 170.

In FIG. 5, when the power is turned on, the controller 180 determines whether or not the write command flag is stored (set) in the buffer memory 170 (S310). The write command flag is recorded (set) in the buffer memory 170 in step S160 or S180 in the flowchart in FIG. 4 which is performed in parallel with the present processing.

When determining that the write command flag is stored (set) in the buffer memory 170, the controller 180 deletes (resets) the write command flag from the buffer memory 170 (S320). When the write command flag is deleted, the controller 180 determines whether or not the target to be written is moving image data or still image data (S330). Specifically, the controller 180 makes the determination by referring to the information regarding the target to be written stored in the buffer memory 170 (the information recorded in the buffer memory 170 in step S160 or S180 in FIG. 4).

When determining that the target to be written is moving image data, the controller 180 reads a moving image pointer from the buffer memory 170 (S340). The "moving image pointer" refers to a pointer which indicates a position (logical address) on the memory card 200 in which moving image data was recorded last. The controller 180 also manages a "still image pointer" which indicates a position (logical address) on the memory card 200 in which still image data was recorded last. By referring to these pointers, the controller 180 determines a data recording start position (logical address) on the memory card 200 in accordance with the type of image data.

After reading the moving image pointer, the controller 180 starts search for a free region to record moving image data, from a logical address on the memory card 200 which is indicated by the read moving image pointer (S360).

On the other hand, when determining that the target to be written is still image data, the controller 180 reads the still image pointer from the buffer memory 170 (S350). After reading the still image pointer, the controller 180 starts search for a free region to record still image data from a logical address on the memory card 200 which is indicated by the read still image pointer (S355).

When having started search for a free region (S360, S355), the controller 180 determines whether or not there is a free region on the memory card 200 (S370). Specifically, in the case of recording moving image data on the memory card 200, the controller 180 makes this determination by checking whether or not there is an AU including no data which should not be deleted. Further, in the case of recording still image data on the memory card 200, the controller 180 makes this determination by checking whether or not the memory card 200 has a free region of which size is large enough to record the target still image data, irrespective of whether or not there is any data which should not be deleted in AU.

When determining in step S370 that there is no free region, the controller 180 stops recording of image data (S380) and controls the display monitor 220 to display an error message (S390).

On the other hand, when determining in step S370 that there is a free region, the controller 180 records the image data (the moving image data or the still image data) in the free region on the memory card 200 (S400). When having completed the recording of the image data on the memory card 200, the controller 180 updates the moving image pointer or the still image pointer (that is, overwrites the information in the buffer memory 170) (S410). Specifically, the controller 180 updates the moving image pointer or the still image pointer to indicate an address on the memory card 200 in which image data was recorded last (S410). After updating the moving image pointer or the still image pointer, the controller 180 records the moving image recording end flag or the still image recording end flag in the buffer memory 170 (S420).

The controller 180 repeats the above processing (the processing from step S310 to step S420) until the power is turned off.

In such a manner, the digital video camera 100 of the present embodiment determines a position to start recording of an image data on the memory card 200 by using the two types of pointers, namely, the moving image pointer (first pointer) regarding the logical recording position for moving image data and the still image pointer (second pointer) regarding the logical recording position for still image data. In other words, the digital video camera 100 of the present embodiment manages separately the position (logical address) on the memory card 200 in which moving image data was recorded last and the position (logical address) on the memory card 200 in which still image data was recorded last.

1-4. Advantages by Moving Image Pointer and Still Image Pointer

As described above, the digital video camera 100 of the present embodiment determines a position on the memory card 200 to start recording of an image data by using two types of pointers, namely, the moving image pointer (first pointer) regarding the recording position for moving image data and the still image pointer (second pointer) regarding the recording position for still image data. Effects obtained by such a configuration will be described below with reference to FIGS. 6 and 7.

In the following description, a case (comparison example) where a position to record moving image data and still image data is indicated using a single pointer, and a case where positions to record moving image data and still image data are indicated using two pointers, respectively, as the present embodiment, will be compared to each other.

Figure 6:
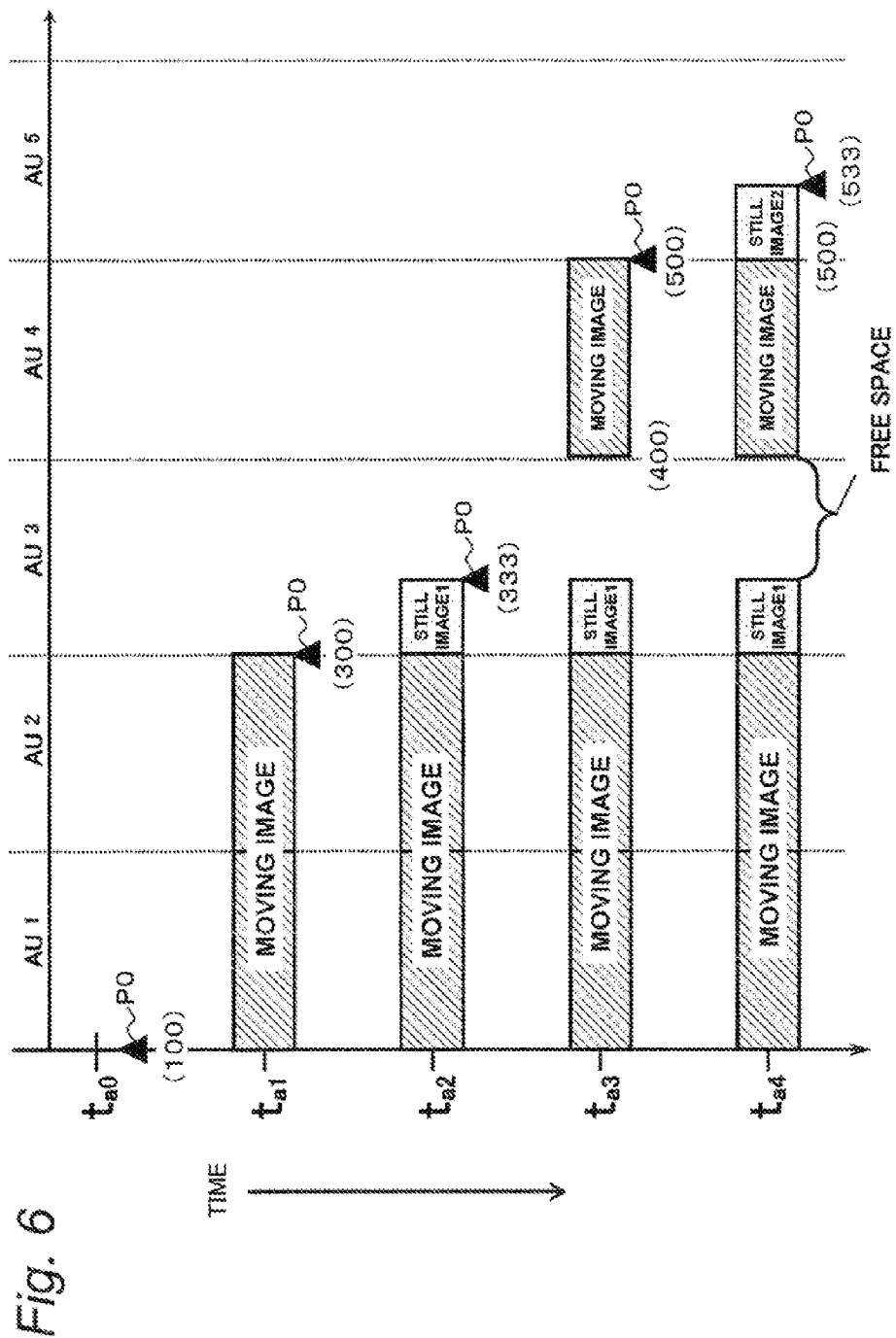
FIG. 6 is a diagram for explaining transition of a pointer which indicates a position (logical address) to record image data in a case where the data is recorded in accordance with a conventional data recording method.

FIG. 6 is a diagram for explaining temporal transition of the logical address of an image data recording position on the memory card in a case, as the comparison example, where a single pointer is used which indicates recording positions of moving image data and still image data. FIG. 7 is a diagram for explaining temporal transition of the logical address of an image data recording position on the memory card in a case where two pointers are used which indicate respectively a moving image data recording position and a still image data recording position in the digital video camera 100 of the present embodiment.

1-4-1. Recording Operation in Comparison Example

A description will be given of operations to record image data on the memory card in a digital video camera in a case where a single pointer is used which indicates recording positions of moving image data and still image data as the comparison example, with reference to FIG. 6.

The horizontal axis of FIG. 6 indicates a logical address of the memory on the memory card and the vertical axis thereof indicates time. In this example, a state at time ta0 is an initial state. At the time ta0, it is assumed that the memory on the memory card has no data recorded therein which should not be deleted. At time ta1, moving image data of the size of two AUs is recorded to the memory in the memory card. At time ta2, data of one still image is further recorded in the memory of the memory card on the state of time ta1. The size of the data of one still image is one-third of one AU size. At time ta3, moving image data of one AU size is further recorded in the memory of the memory card on the state of time ta2. At time ta4, data of one still image is further recorded in the memory on the memory card on the state of time ta3.

In the initial state (time ta0), the pointer P0 indicates an address 100, which is the head address of a first AU (AU1). In this state, when moving image data of the size of two AUs is written to the memory in the memory card, the pointer P0 indicates an address 300, which is the head address of a third AU (AU3) (time ta1). Furthermore, in this state, when data of one still image is written to the memory in the memory card, the pointer P0 indicates an address 333, which is one-third (AU size) ahead of the head address 300 of the third AU (AU3) (time ta2).

In this state (state at the time ta2), when writing moving image data of the size of one AU to the memory in the memory card, the memory controller refers to the pointer, and starts, from an address 520 indicated by the pointer, search for addresses at which the moving image data can be written.

As described above, the real-time recording is important for recording moving image data to a memory card. That is, it is necessary to record the moving image data to the memory card relatively speedily. Therefore, in the present example, as in the case of the digital video camera 100 of the first embodiment, it is necessary to start recording of the moving image data to the memory in the head address of an AU including no data which should not be deleted. Accordingly, when still image data 1 is already recorded in the third AU (AU3), the data is recorded starting at the lead position of the AU rather than starting from somewhere in a halfway region in the third AU (AU3). Therefore, the memory controller searches for the lead position of the AU including no data which should not be deleted.

In the example in FIG. 6, the memory controller searches for the lead position of an AU including no data which should not be deleted, from an address indicated by the pointer P0. As a result, the memory controller identifies an address 400 and starts writing of moving image data of the size of one AU to the memory from this address 400. When the writing of the moving image data of the size of one AU to the memory is completed, the pointer P0 indicates an address 500 (time ta3).

When further writing another piece of still image data to the memory in the memory card in this state (state at time ta3), the memory controller starts writing of the still image data in the address 500 indicated by the pointer P0. When the writing of the one piece of still image data to the memory on the memory card is completed, the pointer P0 indicates an address 533 (time ta4).

As a result, the third AU (AU3) has the still image data recorded only in one-third of its total capacity, so that two-thirds of its total capacity are rendered unused area (that is, a waste region).

1-4-2. Recording Operation of Digital Video Camera of First Embodiment

A description will be given of an example of recording image data to the memory card 200 by the digital video camera 100 of the present invention with the moving image pointer and the still image pointer, with reference to FIG. 7.

In FIG. 7, the horizontal axis indicates a logical address of the memory in the memory card and the vertical axis indicates time. Similarly to FIG. 6, a state at time tb0 in FIG. 7 is an initial state. At the time tb0, it is assumed that the memory 320 in the memory card has no data recorded therein which should not be deleted. At time tb1, moving image data of the size of two AUs is recorded in the memory 320. At time tb2, one piece of still image data is further recorded in the memory 320 on the state of time tb1. The size of the one piece of still image data is one-third of one AU size. At time tb3, moving image data of the size of one AU is further recorded in the memory 320 on the state of time tb2. At time tb4, one more piece of still image data is recorded to the memory in the memory card on the state of time tb3.

The black triangle P1 in FIG. 7 indicates the moving image pointer and the white triangle P2 indicates the still image pointer.

In the initial state (time tb0), the moving image pointer P1 indicates an address 100, which is the head address of the first AU (AU1), and the still image pointer P2 also indicates an address 100, which is the head address of the first AU (AU1). When moving image data of the size of two AUs is written to the memory 320 on the memory card 200 in this state, the moving image pointer P1 indicates an address 300, which is the head address of the third AU (AU3) (time tb1). On the other hand, the still image pointer P2 still indicates the address 100, which is the head address of the AU1 (time tb1).

When writing one piece of still image data to the memory 320 in this state, the controller 180 starts search for a position (logical address) to start writing of still image data, from the address 100 indicated by the still image pointer P2. In the case of the example in FIG. 7, the controller 180 finds out that a region starting from the address 300, which is the head address of the AU3, is a region in which one piece of still image data can be recorded. Therefore, the controller 180 commands the memory controller 310 to start the writing of the still image data 1 from the address 300. When the writing of the one piece of still image data 1 is completed, the still image pointer P2 indicates an address 333, which is one-third of the size of one AU ahead of the head address of the AU3 (state tb2).

When further writing moving image data of the size of one AU to the memory 320 in this state, the controller 180 starts search for the address of a region in which the moving image data can be recorded, from the address 300 indicated by the moving image pointer P1. In this example, the AU3 stores data which should not be deleted therein, and thus the controller 18C finds out an AU4 including no data which should not be deleted and commands the memory controller 310 to start writing of moving image data from an address 400, which is the head address of the AU4. When the writing of the moving image data of the size of one AU to the memory 320 is completed, the moving image pointer P1 indicates an address 500 (time tb3). In this state, the still image pointer P2 still indicates the address 333.

When still further writing one piece of still image data 2 to the memory 320 in this state, the controller 180 starts search for the address of a region in which the one piece of still image data 2 can be recorded, from the address 333 indicated by the still image pointer P2. In this case, since there is a region in which one piece of still image data can be recorded behind the address 333, the memory controller 310 starts writing of the one piece of still image data 2 from the address 333. When the writing of the one piece of still image data 2 is completed, the still image pointer P2 indicates an address 366, which is two-thirds of the size of one AU ahead of the head address of the AU3 (time tb4).

As a result, the third AU (AU3) is used by two-thirds of its total capacity, while leaving one-third of its total capacity as a free region. Subsequently, when the digital video camera 100 further records still image data, the memory controller 310 starts writing of the still image data from the address 366, so that the third AU (AU3) is to be used fully.

In such a manner, the digital video camera 100 of the present embodiment controls a position on the memory card 200 to record image data by using two pointers, namely, the moving image pointer (first pointer) P1 related to recording position of moving image data and the still image pointer (second pointer) P2 related to recording position of still image data. By conducting such control, the digital video camera 100 can manage the recording position in accordance with the data type, that is, unit of data recording, thereby enabling effective use of the recording region in the memory card 200 and reducing waste of the recording region.

1-5. Summary

As described above, the digital video camera 100 of the present embodiment includes a combination of the CMOS image sensor 140 the image processor 160, and the like, for generating moving image data and still image data, and the controller 180 for recording the moving image data and the still image data generated by the CMOS image sensor 140, and the like to the memory card 200. The moving image data and the still image data have different unit (1 AU size, ⅓ AU size) of recording data to the memory card 200. The controller 180 refers to the moving image pointer (first pointer) which indicates a logical position on the memory card 200 for moving image data to determine a position to start recording of the moving image data based on the logical position indicated by the moving image pointer, or refers to the still image pointer (second pointer) which indicates a logical position on the memory card 200 for still image data to determine a position to start recording of still image data based on the logical position indicated by the still image pointer, and starts recording of the moving image data or the still image data at the determined position in the memory card 200.

In this manner, the digital video camera 100 manages positions on the memory card 200 for moving image data and still image data independently of each other. Therefore, the recording positions can be managed in accordance with the data type, that is, the unit of data recording, thereby reducing the waste of the recording region of the recording medium.

Further, in the present embodiment, the memory card 200 includes the memory controller 310 and the memory 320. The memory controller 310 can collectively erase a predetermined unit of data in the memory 320 and write data in the memory 320 after the deletion of the predetermined unit of data. The controller 180 starts recording of moving image data from a logical position which indicates the lead position of a region of the predetermined unit in the memory 320.

Further, in the present embodiment, the moving image pointer indicates a logical position on the memory card 200 in which moving image data was recorded last, while the still image pointer indicates a logical position on the memory card 200 in which still image data was recorded last. When recording moving image data generated by the CMOS image sensor 140, etc., the controller 180 searches for a logical position to start recording of the moving image data based on the logical position indicated by the moving image pointer. On the other hand, when recording still image data generated by the CMOS image sensor 140, etc., the controller 180 searches for a logical position to start recording of the still image data based on the logical position indicated by the still image pointer. The controller 180 starts the recording of the moving image data or the still image data, from the logical position searched for on the memory card 200.

Further, in the present embodiment, the moving image pointer may indicate a logical position in which moving image data is to be recorded next on the memory card 200. Further, the still image pointer may indicate a logical position in which still image data is to be recorded next on the memory card 200. In this case, when recording moving image data generated by the CMOS image sensor 140, etc., the controller 180 may start recording of the moving image data, from the logical position indicated by the moving image pointer. When recording still image data generated by the CMOS image sensor 140, etc., the controller 180 may start recording of the still image data, from the logical position indicated by the still image pointer.

2. Other Embodiments

The first embodiment has been described. However, the embodiment is not limited thereto. Therefore, other embodiments will be described below.

Although the first embodiment has exemplified the CMOS image sensor 140 as the imaging unit, the imaging unit is not limited this. For example, the imaging unit may be configured with a CCD image sensor or an NMOS image sensor.

Further, the image processor 160 and the controller 180 may be configured with one semiconductor chip or different semiconductor chips respectively.

Further, although the first embodiment has set the size of the still image data to one-third of the size of one AU, the still image data need not be set to such a size. The size of the still image data may be set to one-third of the size of one AU or double size of one AU. Further, the size of the still image data may be set to any one of a plurality of sizes.

Further, the first embodiment has been described with reference to the example of recording image data to the memory card 200. However, the present technology is not necessarily be limited to such an example, for example, the concept of the first embodiment can be applied to a case of recording image data in a recording medium such as the internal memory 230, a built-in hard disk, or an optical disk. That is, the concept of the first embodiment can be applied to any recording medium in which a recording position of image data is managed with a pointer.

Further, in the first embodiment, each of the moving image pointer and the still image pointer is information that indicates a logical address on the memory card 200 in which the moving image data or the still image data was recorded last. However, the moving image pointer and the still image pointer are not limited to those. For example, the moving image pointer or the still image pointer may be set to be information that indicates the position of moving image data or still image data to be recorded next on the memory card 200. In this case, the controller 180 can immediately recognize the position to start writing the moving image data or the still image data by referring to the moving image pointer and the still image pointer, so that it is possible to skip the processing of searching for a position to start writing of the image data, thereby saving time required for the search processing.

Further, in the first embodiment, the respective pointers are provided for the moving image data and still image data respectively so that a position to start recording of each type of data can be determined based on each pointer. The data type is not limited to moving image data or still image data, but may be any other data type (audio data, for example). Further, the number of data types is not limited to two. The concept of the first embodiment is effective also in a case of three or more types of data. In the case of three or more types of data, it is only necessary to provide a pointer specific to each type of data, which indicates a logical position of data recorded in the recording medium last or a logical position to record data next. Therefore, the concept of the first embodiment is effective to recording of a plurality of types of data having different recording units to the recording medium.

Further, although in the first embodiment, the example using a digital video camera is described. However the embodiment is not limited thereto. The concept of the first embodiment can be applied generally to a data recording device that records, in a recording medium, plural types of data (for example, moving image data and still image data) having the different recording units to a recording medium, for example, an electronic device such as a digital still camera, a cellular phone provided with a camera function, and a smart phone.

The embodiment is useful in a data recording apparatus for recording, in a recording medium, plural types of data (for example, moving image data and still image data) having different recording units to a recording medium, such as a digital still camera, a cellular phone provided with a camera function, and a smart phone.

What is claimed is:

1. A data recording apparatus comprising:
an acquisition unit configured to acquire a first type data and a second type data; and
a recording unit configured to record the first type data or the second type data acquired by the acquisition unit on a recording medium, wherein
the first type data and the second type data have different units of recording data on the recording medium; and
the recording unit
manages a first pointer which indicates a logical position where the first type data is recorded last on the recording medium and a second pointer which indicates a logical position where the second type data is recorded last on the recording medium, the first pointer and the second pointer being different pointers, when recoding the first type data on the recording medium,
refers to the first pointer to determine a position to start recording the first type data based on the logical position indicated by the first pointer,
starts recording the first type data on the recording medium at the determined start position and updates the first pointer to indicate a logical position where the first type data is recorded last on the recording medium,
when recoding the second type data on the recording medium,
refers to the second pointer to determine a position to start recording the second type data based on the logical position indicated by the second pointer, and
starts recording the second type data on the recording medium at the determined start position and updates the second pointer to indicate a logical position where the second type data is recorded last on the recording medium.

2. The data recording apparatus according to claim 1, wherein the recording medium includes a memory configured to store data and a memory controller configured to control writing or reading data to or from the memory, and
the memory controller can collectively erase data in a predetermined unit in the memory and write data in the memory after erasure of the predetermined unit of data, and
the recording unit starts recording the moving image data from a logical position which indicates a lead position of a region of the predetermined unit in the memory.

3. The data recording apparatus according to claim 1, wherein
when recording the first type data acquired by the acquisition unit, the recording unit searches for a logical position to start recording the first type data based on the logical position indicated by the first pointer,
when recording the second type data acquired by the acquisition unit, the recording unit searches for a logical position to start recording the second type data based on the logical position indicated by the second pointer, and
the recording unit starts recording the first type data or the second type data on the recording medium from the searched logical position.

4. The data recording apparatus according to claim 1, wherein
the first pointer indicates a logical position at which the first type data can be recorded next on the recording medium;
the second pointer indicates a logical position at which the second type data can be recorded next on the recording medium; and
when recording the first type data acquired by the acquisition unit, the recording unit starts recording the first type data at the logical position indicated by the first pointer, and
when recording the second type data acquired by the acquisition unit, the recording unit starts recording the second type data at the logical position indicated by the second pointer.

5. The data recording apparatus according to claim 1, wherein the first type data is moving image data and the second type data is still image data.

6. The data recording apparatus according to claim 1, wherein the recording medium is detachable from the data recording apparatus.

7. An imaging apparatus comprising:
an imaging unit configured to generate moving image data and still image data; and
a recording unit configured to record the moving image data or the still image data generated by the imaging unit in a recording medium, wherein
the recording unit
manages a first pointer which indicates a logical position where the moving picture data is recorded last on the recording medium and a second pointer which indicates a logical position where the still image data is recorded last on the recording medium, the first pointer and the second pointer being different pointers,
when recoding the moving picture data on the recording medium,
refers to the first pointer to determine a logical position to start recording the moving image data based on the logical position indicated by the first pointer,
starts recording the moving picture data on the recording medium at the determined start position and updates the first pointer to indicate a logical position where the moving picture data is recorded last on the recording medium,
when recoding the still picture data on the recording medium,
refers to the second pointer to determine a logical position to start recording the still image data based on the logical position indicated by the second pointer, and
starts recording the still image data on the recording medium at the determined start position and updates the second pointer to indicate a logical position where the still image data is recorded last.

8. The data recording apparatus according to claim 1 wherein the unit of the second type data is more than twice the size of the unit of the first type data.

9. A data recording apparatus comprising:
an acquisition unit configured to acquire a first type data; and
a recording unit configured to record the first type data acquired by the acquisition unit in a recording medium, wherein
the recording unit
manages a first pointer which indicates a logical position where the first type data is recorded last on the recording medium,
when recoding the first type data on the recording medium,
refers to the first pointer to determine a position to start recording the first type data based on the logical position indicated by the first pointer, and
starts recording the first type data on the recording medium at the determined start position and updates the first pointer to indicate a logical position where the first type data is recorded last on the recording medium.

* * * * *